US010660119B2

United States Patent
Pan et al.

(10) Patent No.: US 10,660,119 B2
(45) Date of Patent: May 19, 2020

(54) METHOD AND APPARATUS FOR HANDLING SCELL DEACTIVATION TIMER IN A WIRELESS COMMUNICATION SYSTEM

(71) Applicant: ASUSTek Computer Inc., Taipei (TW)

(72) Inventors: Li-Te Pan, Taipei (TW); Richard Lee-Chee Kuo, Taipei (TW); Yu-Hsuan Guo, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 16/226,215

(22) Filed: Dec. 19, 2018

(65) Prior Publication Data
US 2019/0215848 A1    Jul. 11, 2019

Related U.S. Application Data

(60) Provisional application No. 62/615,214, filed on Jan. 9, 2018.

(51) Int. Cl.
*H04W 72/12* (2009.01)
*H04W 72/14* (2009.01)
*H04W 76/11* (2018.01)
*H04L 1/18* (2006.01)
*H04W 76/27* (2018.01)
*H04W 80/02* (2009.01)

(52) U.S. Cl.
CPC ....... *H04W 72/1263* (2013.01); *H04L 1/1812* (2013.01); *H04W 72/14* (2013.01); *H04W 76/11* (2018.02); *H04W 76/27* (2018.02); *H04W 80/02* (2013.01)

(58) Field of Classification Search
CPC . H04W 72/1263; H04W 72/14; H04W 76/11; H04W 76/27; H04W 80/02; H04W 72/042; H04W 76/38; H04W 72/04; H04W 72/12; H04W 76/00; H04L 1/1812; H04B 7/2123; H04B 7/2121; H04J 2203/0069; H04Q 2213/394
See application file for complete search history.

(56) References Cited

U.S. PATENT DOCUMENTS

| | | | |
|---|---|---|---|
| 2017/0054568 A1* | 2/2017 | Lee | H04W 60/06 |
| 2017/0289995 A1* | 10/2017 | Lin | H04W 72/0413 |
| 2018/0042016 A1* | 2/2018 | Babaei | H04L 5/0032 |
| 2018/0077644 A1* | 3/2018 | Dinan | H04W 72/0413 |
| 2018/0317123 A1* | 11/2018 | Chen | H04W 72/0413 |

FOREIGN PATENT DOCUMENTS

WO    2018031473    2/2018

* cited by examiner

*Primary Examiner* — Sharad Rampuria
(74) *Attorney, Agent, or Firm* — Blue Capital Law Firm, P.C.

(57) ABSTRACT

Methods and apparatuses for handling a SCell deactivation timer in a wireless communication system are disclosed herein. In one method, a network node configures a UE with a first SCell. The network node configures the UE to use a first SCell deactivation timer for the first SCell. The network node configures the UE with a SPS resource on the first SCell. The network node configures the UE not to use the first SCell deactivation timer if a length of the first SCell deactivation timer is shorter than a SPS interval of the SPS resource.

17 Claims, 6 Drawing Sheets

METHOD AND APPARATUS FOR HANDLING SCELL DEACTIVATION TIMER IN A WIRELESS COMMUNICATION SYSTEM

CROSS-REFERENCE TO RELATED APPLICATIONS

The present application claims the benefit of U.S. Provisional Patent Application Ser. No. 62/615,214 filed on Jan. 9, 2018, the entire disclosure of which is incorporated herein in its entirety by reference.

FIELD

This disclosure generally relates to wireless communication networks, and more particularly, to a method and apparatus for handling a SCell deactivation timer in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

Methods and apparatuses for handling a SCell deactivation timer in a wireless communication system are disclosed herein. In one method, a network node configures a UE with a first SCell. The network node configures the UE to use a first SCell deactivation timer for the first SCell. The network node configures the UE with a SPS resource on the first SCell. The network node configures the UE not to use the first SCell deactivation timer if a length of the first SCell deactivation timer is shorter than a SPS interval of the SPS resource.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: TS 38.300 V2.0.0, NR and NG-RAN Overall Description, Stage 2; RAN1 #88bis Chairman's note; RAN1 #89 Chairman's note; RAN1 adhoc #2 Chairman's note; RAN1 #90 Chairman's note; RAN1 adhoc #3 Chairman's note; RAN1 #90bis Chairman's note; RAN1 #91 Chairman's note; RAN2 #99bis Chairman's note; RAN2 #100 Chairman's note; TS 38.321 V15.0.0, Medium Access Control (MAC) protocol specification; TS 38.331 V15.0.0, Radio Resource Control (RRC) protocol specification; and TS 36.331 V14.4.0, Radio Resource Control (RRC) protocol specification. The standards and documents listed above are hereby expressly incorporated by reference in their entirety.

Figure 1:
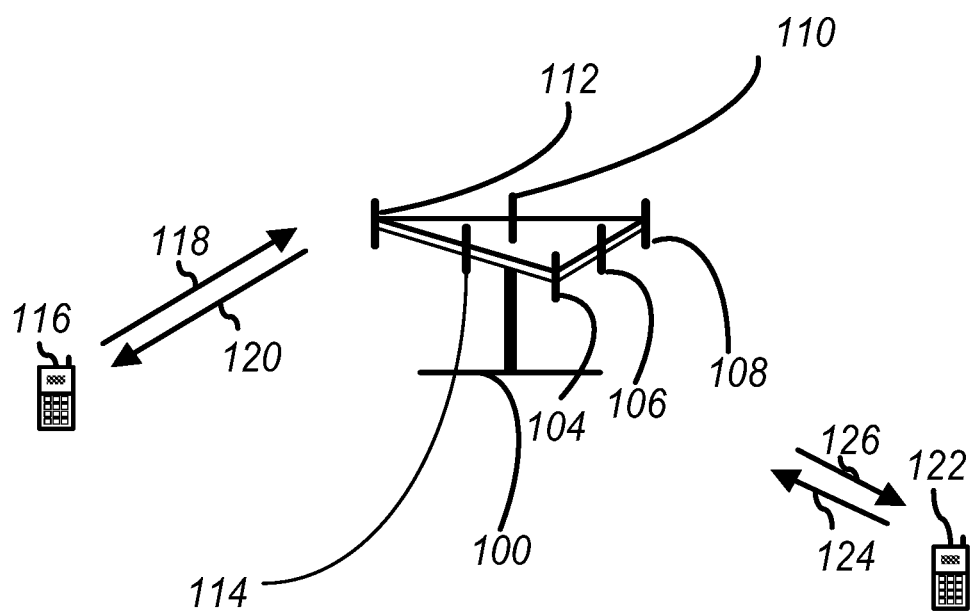
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
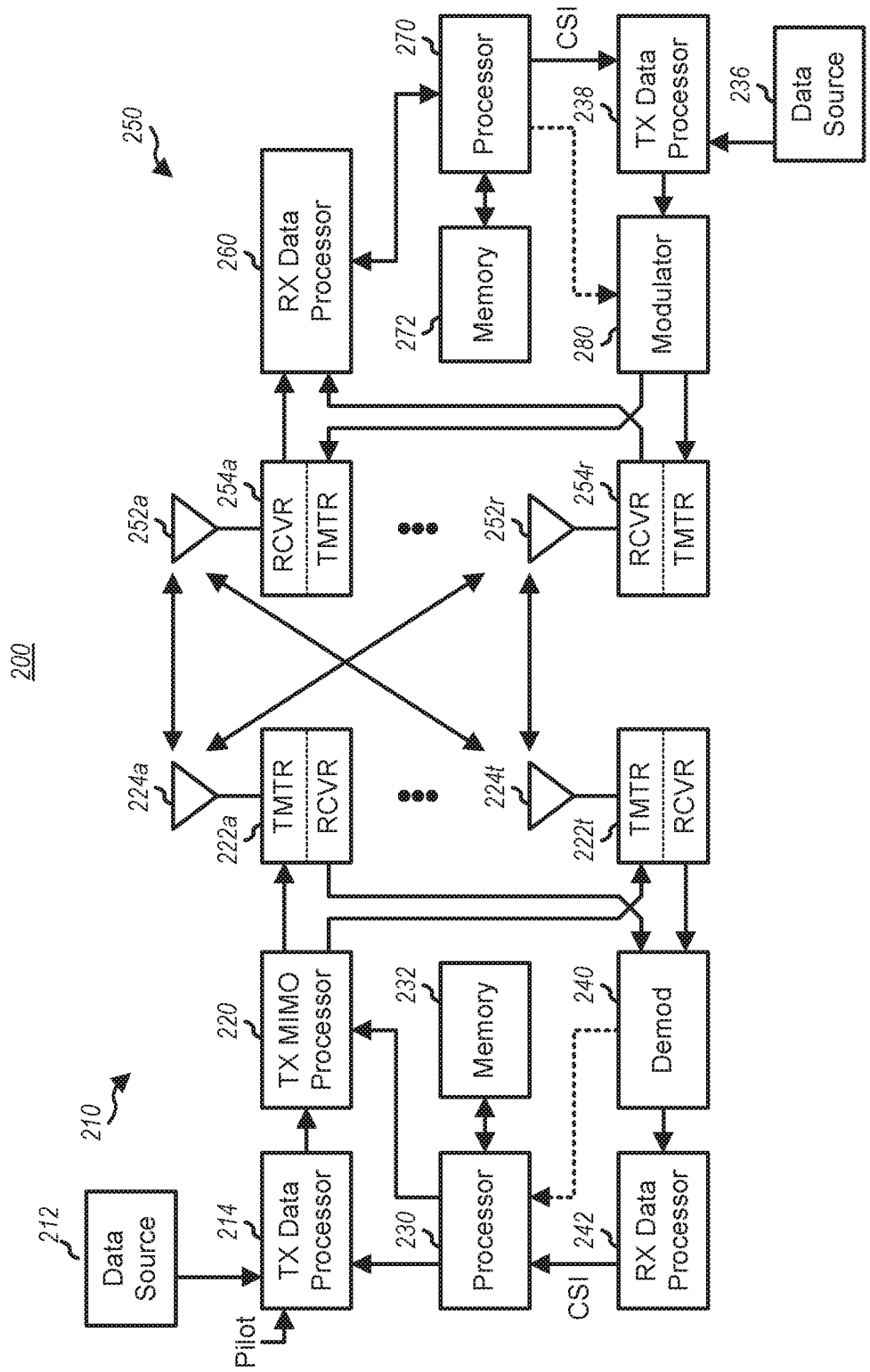
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
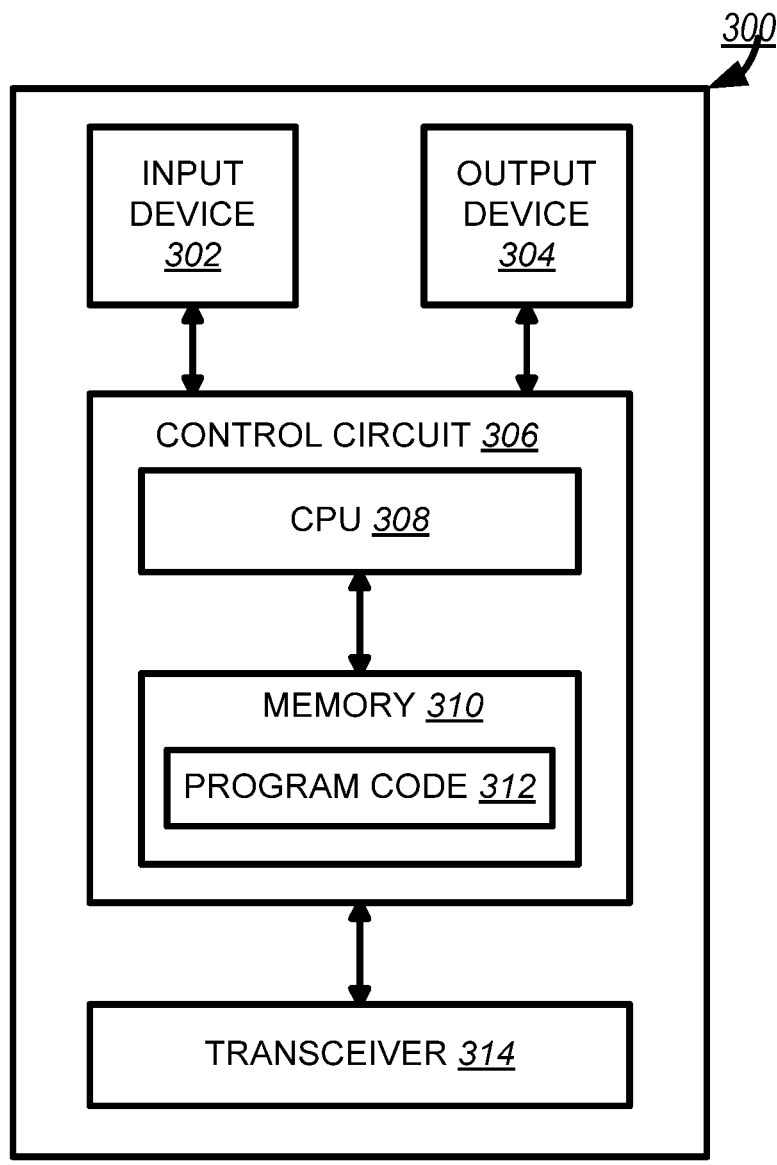
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
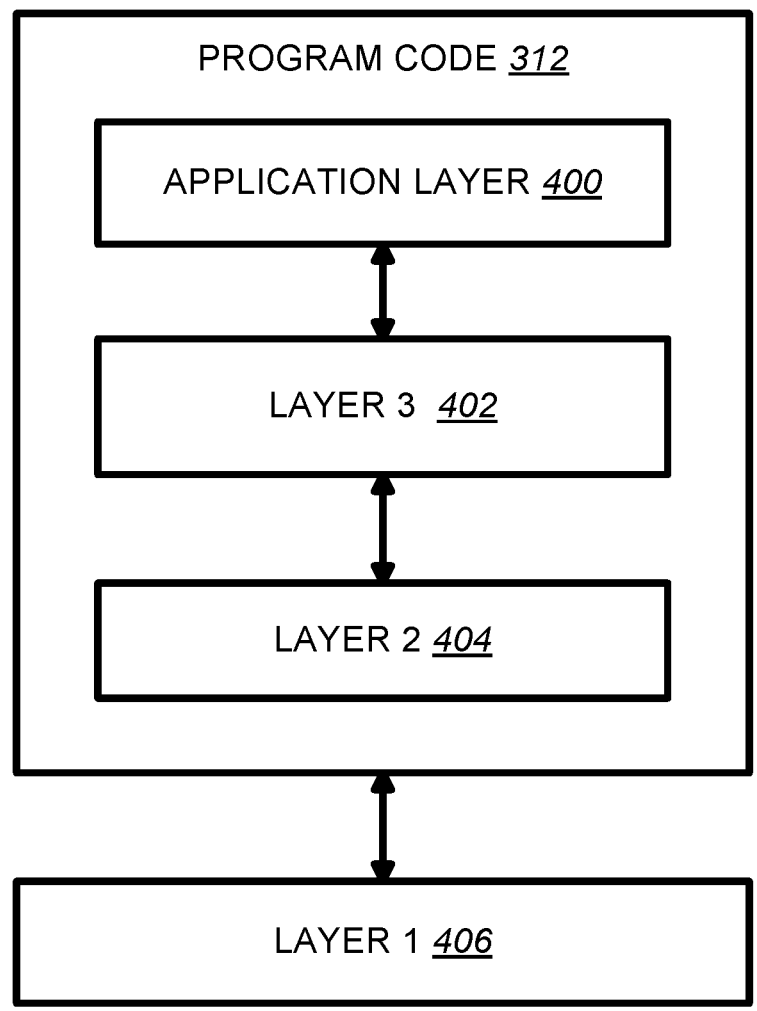
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP standardization activities on next generation (i.e., 5G) access technology has been launched since March 2015. The next generation access technology aims to support the following three families of usage scenarios for satisfying both the urgent market needs and the more long-term requirements set forth by the ITU-R IMT-2020: eMBB (enhanced Mobile Broadband); mMTC (massive Machine Type Communications); and URLLC (Ultra-Reliable and Low Latency Communications).

An objective of the 5G study item on the new radio access technology is to identify and develop technology components needed for new radio systems which should be able to use any spectrum band ranging at least up to 100 GHz. Supporting carrier frequencies up to 100 GHz brings a number of challenges in the area of radio propagation as path loss increases as the carrier frequency increases.

The NR (New Radio) Medium Access Control (MAC) specified transmission and reception without dynamic scheduling in 3GPP TS 38.321 V15.0.0 as disclosed as follows:

5.8 Transmission and Reception without Dynamic Scheduling 5.8.1 Downlink

Semi-Persistent Scheduling (SPS) is configured by RRC per serving cell and per BWP. Multiple configurations can be active simultaneously only on different serving cells. Activation and deactivation of the DL SPS are independent among the Serving Cells.

For the DL SPS, a DL assignment is provided by PDCCH, and stored or cleared based on L1 signalling indicating SPS activation or deactivation.

RRC configures the following parameters when SPS is configured:
    cs-RNTI: CS-RNTI for both activation, deactivation, and retransmission;
    semiPersistSchedIntervalDL: Interval of SPS.

When SPS is released by upper layers, all the corresponding configurations shall be released.

After a downlink assignment is configured for SPS, the MAC entity shall consider sequentially that the $N^{th}$ assignment occurs in the slot for which:

$$(numberOfSlotsPerFrame*SFN+slot\ number\ in\ the\ frame) = [(numberOfSlotsPerFrame*SFN_{start\ time} + slot_{start\ time}) + N*semiPersistSchedIntervalDL* numberOfSlotsPerFrame/10] modulo\ 1024$$

where SFNstart time and slotstart time are the SFN and slot, respectively, at the time the configured downlink assignment were (re-)initialised.

5.8.2 Uplink

There are two types of transmission without dynamic grant:
    configured grant Type 1 where an uplink grant is provided by RRC, and stored as configured uplink grant;
    configured grant Type 2 where an uplink grant is provided by PDCCH, and stored or cleared as configured uplink grant based on L1 signalling indicating configured grant activation or deactivation.

Type 1 and Type 2 are configured by RRC per serving cell and per BWP. Multiple configurations can be active simultaneously only on different serving cells. For Type 2, activation and deactivation are independent among the serving cells. For the same serving cell, the MAC entity is configured with either Type 1 or Type 2.

RRC configures the following parameters when the configured grant Type 1 is configured:
    cs-RNTI: CS-RNTI for retransmission;
    periodicity: periodicity of the configured grant Type 1;
    timeDomainOffset: Offset of a resource with respect to SFN=0 in time domain;
    numberOfConfGrant-Processes: the number of HARQ processes.

RRC configures the following parameters when the configured grant Type 2 is configured:
    cs-RNTI: CS-RNTI for both activation, deactivation, and retransmission;
    periodicity: periodicity of the configured grant Type 2;
    numberOfConfGrant-Processes: the number of HARQ processes.

Upon configuration of a configured grant Type 1 for a serving cell by upper layers, the MAC entity shall:
    1> store the uplink grant provided by upper layers as a configured uplink grant for the indicated serving cell;
    1> initialise (if not active) or re-initialise (if already active) the configured uplink grant to start in the symbol according to timeDomainOffset and to reoccur with periodicity.

After an uplink grant is configured for a configured grant Type 1, the MAC entity shall consider sequentially that the Nth uplink grant occurs associated with the symbol for which:

$$[(SFN*numberOfSlotsPerFrame*numberOfSymbolsPerSlot) + (slot\ number\ in\ the\ frame*numberOfSymbolsPerSlot) + symbol\ number\ in\ the\ slot] = (timeDomainOffset + N*periodicity) modulo\ 1024$$

After an uplink grant is configured for a configured grant Type 2, the MAC entity shall consider sequentially that the Nth uplink grant occurs associated with the symbol for which:

$$[(SFN*numberOfSlotsPerFrame*numberOfSymbolsPerSlot) + (slot\ number\ in\ the\ frame*numberOfSymbolsPerSlot) + symbol\ number\ in\ the\ slot] = [(SFN_{start\ time}*numberOfSlotsPerFrame* numberOfSymbolsPerSlot + slot_{start\ time}*numberOfSymbolsPerSlot + symbol_{start\ time}) N*periodicity] modulo\ 1024$$

where $SFN_{start\ time}$, $slot_{start\ time}$, and $symbol_{start\ time}$ are the SFN, slot, and symbol, respectively, at the time the configured uplink grant was (re-)initialised.

When a configured grant is released by upper layers, all the corresponding configurations shall be released and all corresponding uplink grants shall be cleared immediately.

The MAC entity shall:
    1> if the configured grant has been triggered and not cancelled; and
    1> if the MAC entity has UL resources allocated for new transmission:
        2> instruct the Multiplexing and Assembly procedure to generate an Configured Grant Confirmation MAC CE as defined in subclause 6.1.3.7;
        2> cancel the triggered configured grant confirmation.

For a configured grant Type 2, the MAC entity shall clear the configured uplink grant immediately after first transmission of Configured Grant Confirmation MAC CE triggered by the configured grant deactivation.

Retransmissions except for repetition of configured grants use uplink grants addressed to CS-RNTI.

The NR MAC Specification specified activation/deactivation of SCell (Secondary Cell) in 3GPP TS 38.321 V15.0.0 as disclosed as follows:

5.9 Activation/Deactivation of SCells

If the MAC entity is configured with one or more SCells, the network may activate and deactivate the configured SCells. Upon configuration of an SCell, the SCell is deactivated. The configured SCell(s) is activated and deactivated by:
    receiving the SCell Activation/Deactivation MAC CE described in subclause 6.1.3.9;
    configuring sCellDeactivationTimer timer per configured SCell (except the SCell configured with PUCCH, if any): the associated SCell is deactivated upon its expiry.

The MAC entity shall for each configured SCell:
    1> if an SCell Activation/Deactivation MAC CE is received activating the SCell:
        2> activate the SCell; i.e. apply normal SCell operation including:
            3> SRS transmissions on the SCell;
            3> CQI/PMI/RI/CRI reporting for the SCell;
            3> PDCCH monitoring on the SCell;
            3> PDCCH monitoring for the SCell;
            3> PUCCH transmissions on the SCell, if configured.
        2> start or restart the sCellDeactivationTimer associated with the SCell in the slot when the SCell Activation/Deactivation MAC CE was received;
        2> (re-)initialize any suspended configured uplink grants of configured grant Type 1 associated with this SCell according to the stored configuration, if any, and to start in the symbol according to rules in subclause 5.8.2;
        2> trigger PHR according to subclause 5.4.6.

1> else if an SCell Activation/Deactivation MAC CE is received deactivating the SCell; or
1> if the sCellDeactivationTimer associated with the activated SCell expires:
2> deactivate the SCell;
2> stop the sCellDeactivationTimer associated with the SCell;
2> clear any configured downlink assignment and any configured uplink grant Type 2 associated with the SCell respectively;
2> suspend any configured uplink grant Type 1 associated with the SCell;
2> flush all HARQ buffers associated with the SCell.
1> if PDCCH on the activated SCell indicates an uplink grant or downlink assignment; or
1> if PDCCH on the Serving Cell scheduling the activated SCell indicates an uplink grant or a downlink assignment for the activated SCell:
2> restart the sCellDeactivationTimer associated with the SCell.

1> if the SCell is deactivated:
2> not transmit SRS on the SCell;
2> not report CQI/PMI/RI/CRI for the SCell;
2> not transmit on UL-SCH on the SCell;
2> not transmit on RACH on the SCell;
2> not monitor the PDCCH on the SCell;
2> not monitor the PDCCH for the SCell;
2> not transmit PUCCH on the SCell.

HARQ feedback for the MAC PDU containing SCell Activation/Deactivation MAC CE shall not be impacted by PCell, PSCell and PUCCH SCell interruptions due to SCell activation/deactivation in TS 38.133 [11].

When SCell is deactivated, the ongoing Random Access procedure on the SCell, if any, is aborted.

In 3GPP TS 38.331 V15.0.0, a specified SCell deactivation timer related configuration is disclosed as follows:

MAC-CellGroupConfig

The IE MAC-CellGroupConfig is used to configure MAC parameters for a cell group, including DRX.

MAC-CellGroupConfig Information Element

```
-- ASN1START
-- TAG-MAC-CELL-GROUP-CONFIG-START
MAC-CellGroupConfig ::=   SEQUENCE {
    drx-Config                    DRX-Config
            OPTIONAL, -- Need R
    schedulingRequestConfig       SchedulingRequestConfig
            OPTIONAL,
    bsr-Config                    BSR-Configuration
            OPTIONAL, -- Need N
    tag-Config                    TAG-Configuration
            OPTIONAL, -- Need N
    phr-Config                    PHR-Config
            OPTIONAL, -- Need N
    sCellDeactivationTimer        ENUMERATED {
                    ms20, ms40, ms80, ms160, ms200, ms240, ms320,
ms400, ms480, ms520, ms640, ms720, ms840, ms1280, spare2,
                    spare1}           OPTIONAL, -- Cond
ServingCellWithoutPUCCH
    -- FFS : configurable per SCell?
    skipUplinkTxDynamic           BOOLEAN
}
```

In 3GPP TS 38.331 V15.0.0, a specified Semi-Persistent Scheduling (SPS) related configuration is disclosed as follows:

SPS-Config

Editor's Note: FFS: Relation between (UL-)SPS and "ULtransmissionWithoutGrant". Is it one feature with different configurations as the L1 parameters suggest? How is it modelled in MAC? What about DL?

Editor's Note: FFS: RAN1 indicated in the L1 table: "Note: Multiple configurations is possible, how many needs to be determined". RAN2 agreed that SPS can be used on Pcell and SCell . . . . But each UE can use it on at most one serving cell of a cell group at a time. Are the "multiple configuration" meant for one carrier? Does the UE then use several SPS-RNTIs?

The SPS-Config IE is used to configure semi-persistent transmission according to two possible schemes. The actual uplink grant may either be configured via RRC (type1) or provided via the PDCCH (addressed to SPS-RNTI) (type2).

SPS-Config Information Element

```
-- ASN1START
-- TAG-SPS-CONFIG-START
-- SPS may be configured on the PCell as well as on SCells. But it shall not be configured for
more than
-- one serving cell of a cell group at once.
```

```
SPS-Config ::=                              SEQUENCE {
    -- FFS: Same SPS for UL and DL (like in LTE)? See also naming FFS above.
    -- sps-RNTI                             BIT STRING (SIZE (16))            OPTIONAL,
    -- FSS / TODO: ADD DL SPS!
    -- UL SPS configuration
    -- FFS CHECK: Add possibility to release UL SPS
    uplink                                  SEQUENCE {  periodicity
TYPE_FFS!,
        powerControl                        TYPE_FFS!,
        -- Enable transformer precoder for type1 and type2. Absence indicates that it is
disabled.
        -- Corresponds to L1 parameter 'UL-TWG-tp' (see 38.214, section FFS_Section)
        transformPrecoder                   ENUMERATED {enabled}
                    OPTIONAL,
        -- The number of HARQ processes configured. It applies for both Type 1 and Type 2
        -- Corresponds to L1 parameter 'UL-TWG-numbHARQproc' (see 38.214, section FFS_Section)
        nrofHARQ-processes                  INTEGER(1..FFS_Value)
                    OPTIONAL,
        -- If repetitions is used, this field indicates the redundancy version (RV) sequence to
use.
        -- Corresponds to L1 parameter 'UL-TWG-RV-rep' (see 38.214, section FFS_Section)
        repK-RV                             ENUMERATED {s1-0231, s2-0303, s3-0000}
                    OPTIONAL,
        -- Periodicity for UL transmission without UL grant for type 1 and type 2
        -- Corresponds to L1 parameter 'UL-TWG-periodicity' (see 38.321, section FFS_Section)
        -- The following periodicities are supported depending on the configured subcarrier
spacing [ms]:
        -- 15kHz: 2 symbols 7 symbols, 1, 2, 5, 10, 20, 32, 40, 64, 80, 128, 160, 320, 640
        -- 30kHz: 2 symbols 7 symbols, 0.5, 1, 2, 5, 10, 20, 32, 40, 64, 80, 128, 160, 320, 640
        -- 60kHz: 2 symbols 7 symbols (6 symbols for ECP), 0.25,0.5,1,2,5,10,20,32, 40, 64, 80,
128, 160, 320, 640
        -- 120kHz: 2 symbols, 7 symbols, 0.125,0.25,0.5,1,2,5,10,20, 32, 40, 64, 80, 128, 160,
320, 640 OPTIONAL,
        -- 2 symbols, 7 symbols, 0.125,0.25,0.5,1,2,5,10,20, 32, 40, 64, 80, 128, 160, 320, 640
        priodicity                          ENUMERATED {sym2, sym7, ms0dot125, ms0dot25,
ms0dot5, ms1, ms2, ms5, ms10, ms20,
                                                        ms32, ms40, ms64, ms80, ms128,
ms160, ms320, ms640}         OPTIONAL,
        -- UL-SPS transmission with fully RRC-configured UL grant (Type1) (see 38.214, section
x.x.x.x). FFS_Ref
        -- If not provided or set to release, use UL-SPS transmission with UL grant configured by
DCI addressed to SPS-RNTI (Type2).
        rrcConfiguredUplinkGrant            CHOICE {
            setup                           SEQUENCE {
                FFS: Merge the following two into one. Possibly don't use "periodicity" for
rrcConfiguredUplinkGrant
                timeDomainOffset            TYPE_FFS!,
                timeDomainAllocation        TYPE_FFS!,
                frequencyDomainAllocation   TYPE_FFS!,
                -- UE-specific DMRS configuration:
                dmrs                        TYPE_FFS!,
                mcsAndTBS                   TYPE_FFS!,
                -- The number or repetitions of K:
                repK                        TYPE_FFS!  },
            release                NULL
        }                                                                   OPTIONAL, --
Need M
    }                                                                       OPTIONAL, --
Need M
}
-- TAG-SPS-CONFIG-STOP
-- ASN1STOP
```

In 3GPP TS 36.331 V14.4.0, the interval of the SPS is disclosed as follows:
SPS-Config
The IE SPS-Config is used to specify the semi-persistent scheduling configuration.

SPS-Config Information Element

```
-- ASN1START
SPS-Config ::= SEQUENCE {
    semiPersistSchedC-RNTI          C-RNTI              OPTIONAL,       -- Need OR
    sps-ConfigDL                    SPS-ConfigDL        OPTIONAL,       -- Need ON
```

```
    sps-ConfigUL                                        SPS-ConfigUL           OPTIONAL         -- Need ON
}
SPS-Config-v1430 ::=                    SEQUENCE {
    ul-SPS-V-RNTI-r14                                   C-RNTI                 OPTIONAL,        -- Need OR
    sl-SPS-V-RNTI-r14                                   C-RNTI                 OPTIONAL,        -- Need OR
    sps-ConfigUL-ToAddModList-r14                       SPS-ConfigUL-ToAddModList-r14 OPTIONAL, -- Need ON
    sps-ConfigUL-ToReleaseList-r14                      SPS-ConfigUL-ToReleaseList-r14 OPTIONAL, -- Need ON
    sps-ConfigSL-ToAddModList-r14                       SPS-ConfigSL-ToAddModList-r14 OPTIONAL, -- Need ON
    sps-ConfigSL-ToReleaseList-r14                      SPS-ConfigSL-ToReleaseList-r14 OPTIONAL, -- Need ON
}
SPS-ConfigUL-ToAddModList-r14 ::= SEQUENCE (SIZE (1..maxConfigSPS-r14)) OF SPS-ConfigUL
SPS-ConfigUL-ToReleaseList-r14 ::= SEQUENCE (SIZE (1..maxConfigSPS-r14)) OF SPS-ConfigIndex-r14
SPS-ConfigSL-ToAddModList-r14 ::= SEQUENCE (SIZE (1..maxConfigSPS-r14)) OF SPS-ConfigSL-r14
SPS-ConfigSL-ToReleaseList-r14 ::= SEQUENCE (SIZE (1..maxConfigSPS-r14)) OF SPS-ConfigIndex-r14
SPS-ConfigDL ::= CHOICE{
    release                                             NULL,
    setup                                               SEQUENCE {
        semiPersistSchedIntervalDL                          ENUMERATED {
                                                                sf10, sf20, sf32, sf40, sf64, sf80,
                                                                sf128, sf160, sf320, sf640, spare6,
                                                                spare5, spare4, spare3, spare2,
                                                                spare1},
        numberOfConfSPS-Processes                           INTEGER (1..8),
        n1PUCCH-AN-PersistentList                           N1PUCCH-AN-PersistentList,
        ...,
        [[   twoAntennaPortActivated-r10                    CHOICE {
                release                                         NULL,
                setup                                           SEQENCE {
                    n1PUCCH-AN-PersistentListP1-r10
                    N1PUCCH-AN-PersistenitList
                }
            }                                                                          OPTIONAL      -- Need
ON
        ]]
    }
}
SPS-ConfigUL ::=       CHOICE {
    release                                             NULL,
    setup                                               SEQUENCE {
        semiPersistSchedIntervalUL                          ENUMERATED {
                                                                sf10, sf20, sf32, sf40, sf64, sf80,
                                                                sf128, sf160, sf320, sf640, sf1-v1430,
                                                                sf2-v1430, sf3-v1430, sf4-v1430, sf5-v14130,
                                                                spare1},
        implicitReleaseAfter                                ENUMERATED {e2, e3, e4, e8},
        p0-Persistent                                       SEQUENCE {
            p0-NominalPUSCH-Persistent                          INTEGER (-126..24),
            p0-UE-PUSCH-Persistent                              INTEGER (-8..7)
                                  OPTIONAL,                                            -- Need OP
        twoIntervalsConfig                                  ENUMERATED (true)          OPTIONAL,    -- Cond TDD
        ...,
        [[  p0-PersistentSubframeSet2-r12                   CHOICE {
                release                                         NULL,
                setup                                           SEQUENCE {
                    p0-NominalPUSCH-PersistentSubframeSet2-r12      INTEGER (-126..24),
                    p0-UE-PUSCH-PersistentSubframeSet2-r12          INTEGER (-8..7)
                }
            }                                                                          OPTIONAL     -- Need ON
        ]],
        [[   numberOfConfUlSPS-Processes-r13                INTEGER (1..8)             OPTIONAL     -- Need OR
        ]],
        [[   fixedRV-NonAdaptive-r14                        ENUMERATED {true}          OPTIONAL,    -- Need
OR
             sps-ConfigInidex-r14                           SPS-ConfigIndex-r14        OPTIONAL,    -- Need
OR
             semiPersistSchedIntervalUL-v1430               ENUMERATED {
                                                                sf50, s100, sf200, sf300, sf400, sf500,
                                                                sf600, sf700, sf800, sf900, sf1000, spare5,
                                                                spare4, spare3, spare2, spare1}                  -- Need
OR                                                          OPTIONAL
        ]]
    }
}
SPS-ConfigSL-r14 ::=                    SEQUENCE {
    sps-ConfigIndex-r14                                 SPS-ConfigIndex-r14,
    semiPersistSchedIntervalSL-r14                      ENUMERATED {
                                                            sf20, sf50, sf100, sf200, sf300, sf400,
                                                            sf500, sf600, sf700, sf800, sf900, sf1000,
```

-continued

```
}                                          spare4, spare3, spare2, spare1}
SPS-ConfigIndex-r14 ::=                    INTEGER (1..maxConfigSPS-r14)
N1PUCCH-AN-PersistentList ::=              SEQUENCE (SIZE (1..4)) OF
INTEGER (0..2047)
-- ASN1STOP
```

SPS-Config field descriptions fixedRV-NonAdaptive
If this field is present and skipUplinkTxSPS is configured, non-adaptive retransmissions on configured uplink grant uses redundancy version 0, otherwise the redundancy version for each retransmission is updated based on the sequence of redundancy versions as described in TS 36.321 [6].
implicitReleaseAfter
Number of empty transmissions before implicit release, see TS 36.321 [6, 5.10.2]. Value e2 corresponds to 2 transmissions, e3 corresponds to 3 transmissions and so on. If skipUplinkTxSPS is configured, the UE shall ignore this field.
n1PUCCH-AN-PersistentList, n1PUCCH-AN-PersistentListP1
List of parameter: $n_{PUCCH}^{(1, p)}$ for antenna port P0 and for antenna port P1 respectively, see TS 36.213 [23, 10.1]. Field n1-PUCCH-AN-PersistentListP1 is applicable only if the twoAntennaPortActivatedPUCCH-Format1a1b in PUCCH-ConfigDedicated-v1020 is set to true. Otherwise the field is not configured.
numberOfConfSPS-Processes
The number of configured HARQ processes for downlink Semi-Persistent Scheduling, see TS 36.321 [6].
numberOfConfUlSPS-Processes
The number of configured HARQ processes for uplink Semi-Persistent Scheduling, see TS 36.321 [6]. E-UTRAN always configures this field for asynchronous UL HARQ. Otherwise it does not configure this field.
p0-NominalPUSCH-Persistent
Parameter: $P_{O\_NOMINAL\_PUSCH}(0)$. See TS 36.213 [23, 5.1.1.1], unit dBm step 1. This field is applicable for persistent scheduling, only. If choice setup is used and p0-Persistent is absent, apply the value of p0-NominalPUSCH for p0-NominalPUSCH-Persistent. If uplink power control subframe sets are configured by tpc-SubframeSet, this field applies for uplink power control subframe set 1.
p0-NominalPUSCH-PersistentSubframeSet2
Parameter: $P_{O\_NOMINAL\_PUSCH}(0)$. See TS 36.213 [23, 5.1.1.1], unit dBm step 1. This field is applicable for persistent scheduling, only. If p0-PersistentSubframeSet2-r12 is not configured, apply the value of p0-NominalPUSCH-SubframeSet2-r12 for p0-NominalPUSCH-PersistentSubframeSet2. E-UTRAN configures this field only if uplink power control subframe sets are configured by tpc-SubframeSet, in which case this field applies for uplink power control subframe set 2.
p0-UE-PUSCH-Persistent
Parameter: $P_{O\_UE\_PUSCH}(0)$. See TS 36.213 [23, 5.1.1.1], unit dB. This field is applicable for persistent scheduling, only. If choice setup is used and p0-Persistent is absent, apply the value of p0-UE-PUSCH for p0-UE-PUSCH-Persistent. If uplink power control subframe sets are configured by tpc-SubframeSet, this field applies for uplink power control subframe set 1.
p0-UE-PUSCH-PersistentSubframeSet2
Parameter: $P_{O\_UE\_PUSCH}(0)$. See TS 36.213 [23, 5.1.1.1], unit dB. This field is applicable for persistent scheduling, only. If p0-PersistentSubframeSet2-r12 is not configured, apply the value of p0-UE-PUSCH-SubframeSet2 for p0-UE-PUSCH-PersistentSubframeSet2. E-UTRAN configures this field only if uplink power control subframe sets are configured by tpc-SubframeSet, in which case this field applies for uplink power control subframe set 2.
semiPersistSchedC-RNTI
Semi-persistent Scheduling C-RNTI, see TS 36.321 [6].
semiPersistSchedIntervalDL
Semi-persistent scheduling interval in downlink, see TS 36.321 [6]. Value in number of sub-frames. Value sf10 corresponds to 10 sub-frames, sf20 corresponds to 20 sub-frames and so on. For TDD, the UE shall round this parameter down to the nearest integer (of 10 sub-frames), e.g. sf10 corresponds to 10 sub-frames, sf32 corresponds to 30 sub-frames, sf128 corresponds to 120 sub-frames.
semiPersistSchedIntervalSL
Semi-persistent scheduling interval in sidelink, see TS 36.321 [6]. Value in number of sub-frames. Value sf20 corresponds to 20 sub-frames, sf50 corresponds to 50 sub-frames and so on.
semiPersistSchedIntervalUL
Semi-persistent scheduling interval in uplink, see TS 36.321 [6]. Value in number of sub-frames. Value sf10 corresponds to 10 sub-frames, sf20 corresponds to 20 sub-frames and so on. For TDD, when the configured Semi-persistent scheduling interval is greater than or equal to 10 sub-frames, the UE shall round this parameter down to the nearest integer (of 10 sub-frames), e.g. sf10 corresponds to 10 sub-frames, sf32 corresponds to 30 sub-frames, sf128 corresponds to 120 sub-frames. If semiPersistSchedIntervalUL-v1430 is configured, the UE only considers this extension (and ignores semiPersistSchedIntervalUL i.e. without suffix).
sl-SPS-V-RNTI
SL Semi-Persistent Scheduling V-RNTI for V2X sidelink communication, see TS 36.321 [6].
sps-ConfigIndex
Indicates the index of one of multiple SL/UL SPS configurations.
sps-ConfigSL-ToAddModList
Indicates the SL SPS configurations to be added or modified, identified by SPS-ConfigIndex.
sps-ConfigSL-ToReleaseList
Indicates the SL SPS configurations to be released, identified by SPS-ConfigIndex.
sps-ConfigUL-ToAddModList
Indicates the UL SPS configurations to be added or modified, identified by SPS-ConfigIndex.
sps-ConfigUL-ToReleaseList
Indicates the UL SPS configurations to be released, identified by SPS-ConfigIndex.

| SPS-Config field descriptions |
| --- |
| twoIntervalsConfig<br>Trigger of two-intervals-Semi-Persistent Scheduling in uplink. See TS 36.321 [6, 5.10]. If this field is present and the configured Semi-persistent scheduling interval greater than or equal to 10 sub-frames, two-intervals-SPS is enabled for uplink. Otherwise, two-intervals-SPS is disabled.<br>ul-SPS-V-RNTI<br>UL Semi-Persistent Scheduling V-RNTI for UEs capable of multiple uplink SPS configurations and which support V2X communication, see TS 36.321 [6]. |

Currently, based on the NR Radio Resource Control (RRC) specification as disclosed in 3GPP TS 38.331 V15.0.0, the value of the SCell deactivation timer is configured per cell group. For example, a cell group could contain a first SCell and a second SCell. The first SCell could be activated to serve an UE. The second SCell could be further activated to serve the UE together with the first SCell. The UE could start or restart a first SCell deactivation timer associated with the first SCell. The UE could start or restart a second SCell deactivation timer associated with the second SCell. Based on 3GPP TS 38.331 V15.0.0, both the first SCell deactivation timer and the second SCell deactivation timer share the same value for which the UE controls the length of the associated timer based on the value.

According to the NR MAC specification as disclosed in 3GPP TS 38.321 V15.0.0, the UE could start or restart a SCell deactivation timer associated with a SCell (which may not be configured with Physical Uplink Control Channel (PUCCH)) when dynamic scheduling (e.g., by Physical Downlink Control Channel (PDCCH) indicating a downlink assignment or an uplink grant) for the SCell or a SCell Activation/Deactivation MAC control element activating the SCell is received. Upon expiry of the SCell deactivation timer, the UE does not perform any uplink transmission (e.g. SRS, CQI/PMI/RI/CRI report, UL-SCH, PUCCH, etc.) on the SCell, not monitor (e.g. PDCCH) for the SCell and/or not monitor (e.g. PDCCH) on the SCell. However, it is not specified that a UE should restart the SCell deactivation timer when a transmission or reception based on configured resources (e.g., configured grant Type 1, configured grant Type 2, or configured DL assignment) occurs. In this situation, if a UE is configured to start or restart the SCell deactivation timer for the SCell before being configured with configured resources and then the network configures the UE with the configured resources on the SCell, the UE may deactivate the SCell (due to expiry of the SCell deactivation timer) while there is still ongoing downlink or uplink traffic waiting for reception/transmission. To avoid this, the network needs to send a dedicated signaling (e.g., SCell Activation/Deactivation MAC Control Element (CE)) to keep the UE to activate the SCell again. Furthermore, the network also needs to send a dedicated signaling (e.g., physical signaling) to the UE to (re-)activate or (re-)initialize configured resources or newly configured resources on the SCell because the old configured resources on the SCell cannot be used after deactivation of the SCell. But, this solution results in signaling overhead. Other better alternatives can be considered to solve this problem.

Possibly, the UE could run a SCell deactivation timer for a SCell on which configured resources could be configured on the SCell. The SCell could belong to a cell group. The UE could be configured with the SCell deactivation timer for the SCell or the cell group. The UE could be configured with Type 1 configuration or RRC configuration for SPS on the SCell (via, e.g., RRC signalling, MAC control element, or physical signalling). The UE could be configured with the configured resources (via, e.g., RRC signalling, MAC control element, or physical signaling). The SCell could be configured with PUCCH.

In one example, the UE could start or restart the SCell deactivation timer for the SCell when a transmission or reception based on the configured resources (e.g., a configured uplink grant or a configured downlink assignment) occurs.

In one example, the UE could start or restart the SCell deactivation timer with a first value for the SCell if the SCell is not configured with the configured resources. In this example, the UE could start or restart the SCell deactivation timer with a second value for the SCell if the SCell is configured with the configured resources. Alternately, the UE could control the length of the SCell deactivation timer based on the first value if the UE starts or restarts the timer with the first value. Alternately, the UE could control the length of the SCell deactivation timer based on the second value if the UE starts or restarts the timer with the second value. The UE could be configured with the first value by a base station. The UE could be configured or reconfigured with the second value by the base station. The UE could be pre-configured with the second value. The first value could be shorter/smaller than the second value. The second value could be infinite or a value resulting in the length of the SCell deactivation timer using the value being longer/larger than the length of the SPS interval so as to avoid expiry of the SCell deactivation timer during an SPS interval. The first value could be associated with the SCell. Alternately, the first value could be associated with the cell group. The second value could be associated with the SCell. Alternatively, the second value could be associated with the cell group. The UE could start or restart the SCell deactivation timer with the second value when a transmission or reception based on the configured resources occurs.

In another example, the UE could start or restart the SCell deactivation timer with a first value for the SCell if the SCell is not configured with Type 1 configuration or RRC configuration for SPS. In this example, the UE could start or restart the SCell deactivation timer with a second value for the SCell if the SCell is configured with the Type 1 configuration or RRC configuration for SPS. Alternately, the UE could control the length of the SCell deactivation timer based on the first value if the UE starts or restarts the timer with the first value. Alternately, the UE could control the length of the SCell deactivation timer based on the second value if the UE starts or restarts the timer with the second value. Alternately, the UE could be configured with the first value by a base station. Alternately, the UE could be configured or reconfigured with the second value by the base station. Alternatively, the UE could be pre-configured with the second value. The first value could be shorter/smaller than the second value. Alternatively, the second value could be infinite or a value resulting in the length of the SCell deactivation timer using the value being longer/larger than the length of the SPS interval. The first value could be associated with the SCell. Alternatively, the first value could be associated with the cell group. The second value could be associated with the SCell. Alternately, the second value could be associated with the cell group. The UE could start or restart the SCell deactivation timer with the second value when a transmission or reception based on the configured resources occurs.

In one example, the network could re-configure the UE to set and/or use the SCell deactivation timer with the second value for the SCell or the cell group if the network configures the configured resources on the SCell.

In one example, the network could re-configure the UE to set and/or use the SCell deactivation timer with the second value for the SCell or the cell group before/when/after the network configures the configured resources on the SCell.

In one example, the network could re-configure the UE to set and/or use the SCell deactivation timer with the second value for the SCell or the cell group if the network configures the Type 1 configuration or RRC configuration for SPS on the SCell.

In one example, the network could re-configure the UE to set and/or use the SCell deactivation timer with the second value for the SCell or the cell group before/when/after the network configures the Type 1 configuration or RRC configuration for SPS on the SCell.

In one possible example, the UE could not run a SCell deactivation timer for a SCell on which configured resources could be configured on the SCell. The SCell could belong to a cell group. The UE could be configured with the SCell deactivation timer for the SCell or the cell group. The UE could be configured with Type 1 configuration or RRC configuration for SPS on the SCell (via e.g. RRC signaling, MAC control element or physical signaling). The UE could be configured with the configured resources (via e.g. RRC signaling, MAC control element or physical signaling). The SCell could be configured with PUCCH.

In one example, the UE could not start or restart the SCell deactivation timer for the SCell when a transmission or reception based on the configured resources occurs.

In one example, the UE could not start or restart the SCell deactivation timer for the SCell if the SCell is configured with the configured resources. In this example, the UE could start or restart the SCell deactivation timer with a value for the SCell if the SCell is not configured with the configured resources. The UE could control the length of the SCell deactivation timer based on the value if the UE starts or restarts the timer with the value. The UE could be configured with the value by a base station. The value could be associated with the SCell. The value could be associated with the cell group. The UE does not start or restart the SCell deactivation timer for the SCell when a transmission or reception based on the configured resources on the SCell occurs. The SCell deactivation timer could be running before the UE is configured with the configured resource on the SCell. In that situation, the UE could stop the SCell deactivation timer for the SCell when it is configured to activate, reactivate, initiate, or reinitiate the configured resources (via e.g. RRC signaling, MAC control element or physical signaling) for the SCell. The UE could start or restart the SCell deactivation timer for the SCell when it is configured to deactivate or release the configured resources (via e.g. RRC signaling, MAC control element or physical signaling) for the SCell.

In one example, the UE could not start or restart the SCell deactivation timer for the SCell if the SCell is configured with Type 1 configuration or RRC configuration for SPS. In this example, the UE could start or restart the SCell deactivation timer with a value for the SCell if the SCell is not configured with the Type 1 configuration or a RRC configuration for SPS. The UE could control the length of the SCell deactivation timer based on the value if the UE starts or restarts the timer with the value. The UE could be configured with the value by a base station. The value could be associated with the SCell. Alternately, the value could be associated with the cell group. The SCell deactivation timer could be running before the UE is configured with the Type 1 configuration or RRC configuration for SPS on the SCell. In that situation, the UE could stop the SCell deactivation timer for the SCell when it is configured with the Type 1 configuration or RRC configuration for SPS (via e.g. RRC signaling, MAC control element or physical signaling) for the SCell. The UE could start or restart the SCell deactivation timer for the SCell when it is configured to release the Type 1 configuration or RRC configuration for SPS (via e.g. RRC signaling, MAC control element or physical signaling) for the SCell.

In one example, the network could de-configure the UE to use the SCell deactivation timer for the SCell or the cell group if the network configures the configured resources on the SCell. In other words, the SCell deactivation timer is disabled.

In one example, the network could de-configure the UE to use the SCell deactivation timer for the SCell or the cell group before/when/after the network configures the configured resources on the SCell.

In one example, the network could de-configure the UE to use the SCell deactivation timer for the SCell or the cell group if the network configures the Type 1 configuration or RRC configuration for the SPS on the SCell.

In one example, the network could de-configure the UE to use the SCell deactivation timer for the SCell or the cell group before/when/after the network configures the Type 1 configuration or RRC configuration for the SPS on the SCell.

In one possible example, the network could configure the UE with configured resources only on a PUCCH SCell. Furthermore, the network could configure the UE with Type 1 configuration or RRC configuration for SPS only on the PUCCH SCell. The UE would not use the SCell deactivation timer for the PUCCH SCell. Thus, the UE would not deactivate the PUCCH SCell due to expiry of the SCell deactivation timer while it is transmitting or receiving based on the configured resources. A PUCCH SCell could mean a SCell configured with PUCCH.

In another alternative to solve the issue mentioned above could be that a UE determines whether to deactivate a SCell when a SCell deactivation timer for the SCell expires based on whether there is any configured downlink assignment or configured grant (Type 1 or Type 2) on the SCell for the UE. The UE could not deactivate the SCell if there is any configured downlink assignment or configured grant (Type 1 or Type 2) on the SCell for the UE. The UE may not deactivate the SCell when the SCell deactivation timer for the SCell expires if there is any configured downlink assignment or configured grant (Type 1 or Type 2) on the SCell for the UE. For example, the UE could not deactivate the SCell if it is configured with Type 1 configuration or RRC configuration for the SPS on the SCell. For another example, the UE could not deactivate the SCell if configured resources (e.g. Type 1 resources or SPS resources) is not initialized, reinitialized, activated, or reactivated (via e.g. RRC signaling, MAC control element or physical signaling) on the SCell. In addition, the UE could start or restart a SCell deactivation timer for the SCell. When the SCell deactivation timer expires, the UE could not deactivate the SCell if the Type 1 configuration or the RRC configuration for the SPS on the SCell and/or the configured resources are initialized, reinitialized, activated, or reactivated on the SCell. More specifically, the UE could start or restart the SCell deactivation timer upon the expiry of the SCell deactivation timer if the Type 1 configuration or the RRC configuration for the SPS on the SCell and/or the configured resources are initialized, reinitialized, activated, or reactivated on the SCell.

The UE may deactivate a SCell when a SCell deactivation timer for the SCell expires if there is no configured downlink assignment or configured grant (Type 1 or Type 2) on the SCell for the UE. The UE may deactivate the SCell when the SCell deactivation timer expires if there is no configured downlink assignment or configured grant (Type 1 or Type 2) on the SCell for the UE. The UE may deactivate the SCell when the SCell deactivation timer expires if there is no configured downlink assignment or configured grant (Type 1 or Type 2) on the SCell for the UE. The SPS may be configured grant type 1. The SPS may be configured grant type 2.

According to one method, the 3GPP TS 38.321 may be modified such that the MAC entity shall for each configured SCell:
1> if PDCCH on the activated SCell indicates an uplink grant or downlink assignment; or
1> if PDCCH on the Serving Cell scheduling the activated SCell indicates an uplink grant or a downlink assignment for the activated SCell; or
1> if a downlink assignment for SPS or an uplink grant is configured in the slot for the activated S Cell:
2> restart the sCellDeactivationTimer associated with the SCell.

According to one method, the 3GPP TS 38.321 may be modified such that if the MAC entity is configured with one or more SCells, the network may activate and deactivate the configured SCells. Upon configuration of an SCell, the SCell is deactivated. The configured SCell(s) is activated and deactivated by:
receiving the SCell Activation/Deactivation MAC CE described in subclause 6.1.3.9;
configuring sCellDeactivationTimer timer per configured SCell (except the SCell configured with PUCCH, downlink assignment for SPS, or configured grant, if any): the associated SCell is deactivated upon its expiry.

According to one method, a network node could configure a UE with a first SCell. The network node could configure the UE to use a first SCell deactivation timer for the first SCell. The network node could configure the UE with a SPS resource on the first SCell. The network node could configure the UE not to use the first SCell deactivation timer for the first SCell.

In one or more of the above-disclosed methods, a first dedicated signalling used to configure the UE to use the first SCell deactivation timer for the first SCell could be sent to the UE.

In one or more of the above-disclosed methods, a second dedicated signalling used to configure the SPS configuration could be sent to the UE.

In one or more of the above-disclosed methods, a third dedicated signalling used to configure the UE not to use the first SCell deactivation timer for the first SCell could be sent to the UE.

In one or more of the above-disclosed methods, the second dedicated signalling could be the same as the third dedicated signalling.

In one or more of the above-disclosed methods, de-configuration of the first SCell deactivation timer could be included in the third dedicated signalling.

In one or more of the above-disclosed methods, the network could further configure the UE with a second SCell.

In one or more of the above-disclosed methods, the second SCell is not configured with the SPS resource.

In one or more of the above-disclosed methods, the first SCell and the second SCell could belong to same cell group.

In one or more of the above-disclosed methods, the network node could further configure the UE to use the first SCell deactivation timer for the second SCell.

In one or more of the above-disclosed methods, the network node could configure the UE to use a second SCell deactivation timer for the second SCell.

In one or more of the above-disclosed methods, the network node could configure the UE not to use the first SCell deactivation timer for the first SCell before releasing the SPS resource.

In another method, the network node could configure a UE with a first SCell. The network node could configure the UE to set and/or use a first SCell deactivation timer with a first value for the first SCell. The network node could configure the UE with SPS resource on the first SCell. The network node could configure the UE to set and/or use the first SCell deactivation timer with a second value for the first SCell.

In one or more of the above-disclosed methods, a first dedicated signalling used to configure the UE to set and/or use the first SCell deactivation timer with the first value for the first SCell could be sent to the UE.

In one or more of the above-disclosed methods, a first dedicated signalling used to configure the UE to set and/or use the first SCell deactivation timer with the first value for the first SCell could be sent to the UE.

In one or more of the above-disclosed methods, a second dedicated signalling used to configure the SPS configuration could be sent to the UE.

In one or more of the above-disclosed methods, a third dedicated signalling used to configure the UE to set and/or use the first SCell deactivation timer with the second value for the first SCell could be sent to the UE.

In one or more of the above-disclosed methods, the second dedicated signalling could be the same as the third dedicated signalling.

In one or more of the above-disclosed methods, the network could further configure the UE with a second SCell.

In one or more of the above-disclosed methods, the second SCell could not be configured with the SPS resource.

In one or more of the above-disclosed methods, the first SCell and the second SCell could belong to same cell group.

In one or more of the above-disclosed methods, the network node could further configure the UE to set and/or use the first SCell deactivation timer with the first value for the second SCell.

In one or more of the above-disclosed methods, the network node could further configure the UE to set and/or use a second SCell deactivation timer with the first value for the second SCell.

In one or more of the above-disclosed methods, the network node could further configure the UE to set and/or use the first SCell deactivation timer with the second value for the first SCell before releasing the SPS resource.

In another method, the UE could be configured with a first SCell. The UE could be configured to set and/or use a first SCell deactivation timer with a first value for the first SCell. The UE could be configured with a SPS resource on the first SCell. The UE could start or restart the first SCell deactivation timer with the first value if a transmission or reception based on the SPS resource occurs.

In one or more of the above-disclosed methods, the transmission or reception based on the SPS resource could mean that the transmission or reception is performed due to a configured uplink grant or a configured downlink assignment.

In one or more of the above-disclosed methods, the UE could initialize the configured uplink grant or the configured downlink assignment if a PDCCH addressed to a CS-RNTI for the first SCell is received.

In one or more of the above-disclosed methods, the UE could further start or restart the first SCell deactivation timer if a PDCCH indicating an uplink grant or a downlink assignment on the first SCell is received.

In one or more of the above-disclosed methods, the UE could further deactivate the first SCell if the first SCell deactivation timer expires.

As those skilled in the art will appreciate, the various disclosed embodiments may be combined to form new embodiments and/or methods.

Figure 5:
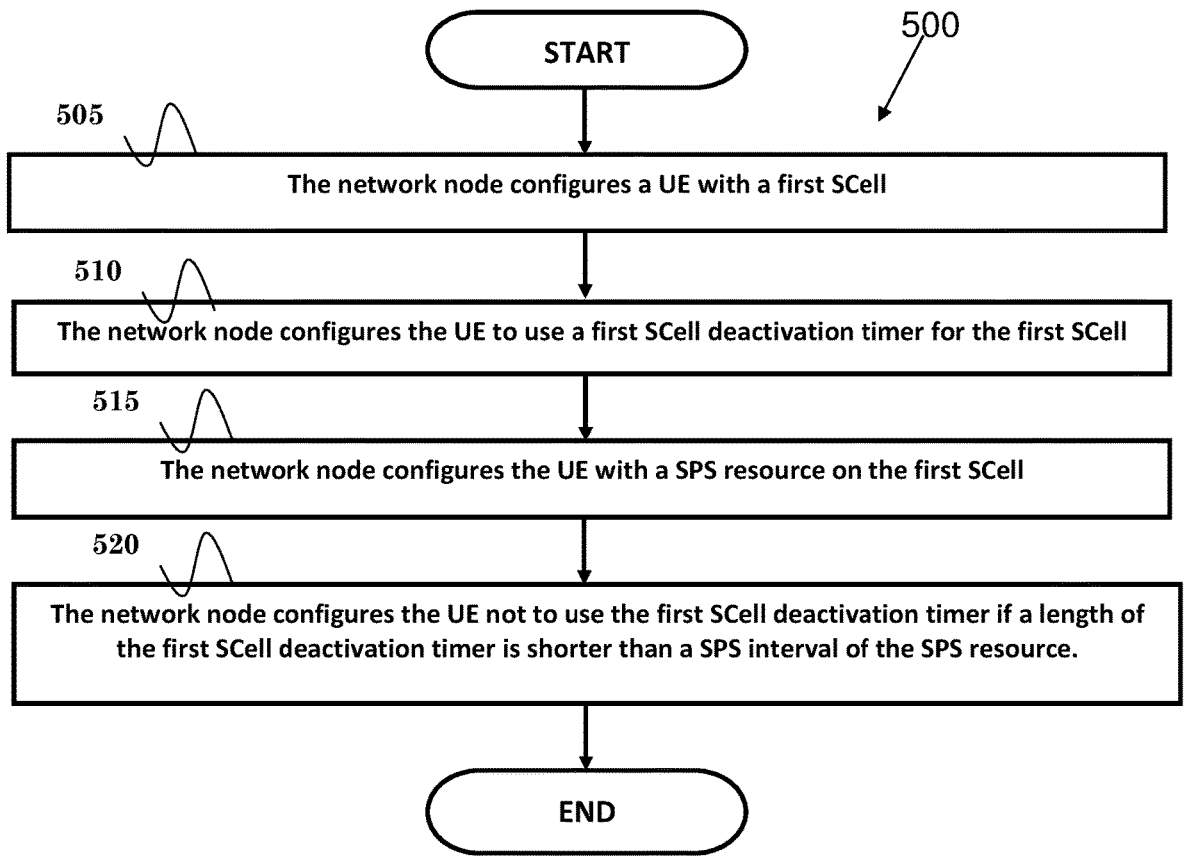
FIG. 5 is a flow diagram for one exemplary embodiment from the perspective of a network node.

FIG. 5 is a flow chart 500 according to one exemplary embodiment from the perspective of a network node. In step 505, the network node configures a UE with a first SCell. In step 510, the network node configures the UE to use a first SCell deactivation timer for the first SCell. In step 515, the network node configures the UE with a SPS resource on the first SCell. In step 520, the network node configures the UE not to use the first SCell deactivation timer if a length of the first SCell deactivation timer is shorter than a SPS interval of the SPS resource.

In another method, the network node could not configure the UE not to use the first SCell deactivation timer if the length of the first SCell deactivation timer is longer than or equal to the SPS interval of the SPS resource.

In another method, the network node could configure the SPS interval and configure the UE not to use the first SCell deactivation timer via different dedicated signalling or the same dedicated signalling.

In another method, the dedicated signalling could be a RRC signalling.

In another method, the first SCell deactivation timer could be started or restarted if a downlink control information for the first SCell is transmitted to the UE, a packet is transmitted on the first SCell to the UE, and/or a packet is received on the first SCell from the UE.

In another method, the first SCell could be deactivated when the first SCell deactivation timer expires.

In another method, the UE could use the first SCell deactivation timer when receiving a dedicated signalling for configuring the UE with the SPS resource.

In another method, the SPS resource could be a resource on which the UE periodically performs an uplink transmission or a downlink reception.

In another method, the SPS interval could be an interval between two uplink transmissions or two downlink receptions performed by the UE based on the SPS resource.

Figure 6:
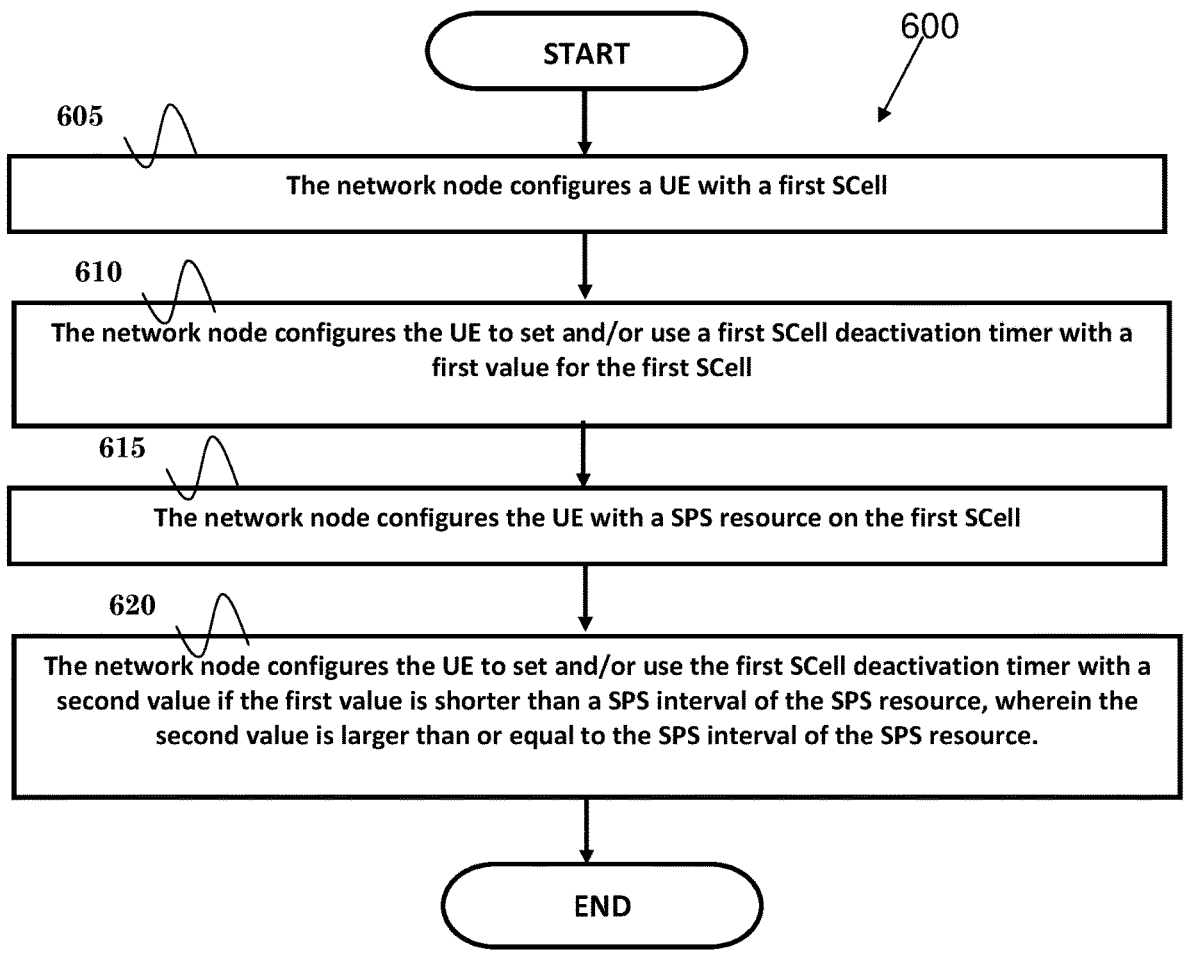
FIG. 6 is a flow diagram for one exemplary embodiment from the perspective of a network node.

FIG. 6 is a flow chart 600 according to one exemplary embodiment from the perspective of a network node. In step 605, the network node configures a UE with a first SCell. In step 610, the network node configures the UE to set and/or use a first SCell deactivation timer with a first value for the first SCell. In step 615, the network node configures the UE with a SPS resource on the first SCell. In step 620, the network node configures the UE to set and/or use the first SCell deactivation timer with a second value if the first value is shorter than a SPS interval of the SPS resource, wherein the second value is larger than or equal to the SPS interval of the SPS resource.

In another method, the network node could not configure the UE to set and/or use the first SCell deactivation timer with the second value if the first value is longer than or equal to the SPS interval of the SPS resource.

In another method, the network node could configure the SPS interval and configure the UE to set and/or use the first SCell deactivation timer with the second value via different dedicated signalling or the same dedicated signalling.

In another method, the dedicated signalling could be a RRC signalling.

In another method, the first SCell deactivation timer could be started or restarted if a downlink control information for the first SCell is transmitted to the UE, a packet is transmitted on the first SCell to the UE, and/or a packet is received on the first SCell from the UE.

In another method, the first SCell could be deactivated when the first SCell deactivation timer expires.

In another method, the UE could use the first SCell deactivation timer when receiving a dedicated signalling for configuring the UE with the SPS resource.

In another method, the SPS resource could be a resource on which the UE periodically performs uplink transmission or downlink reception.

In another method, the SPS interval could be an interval between two uplink transmissions or two downlink receptions performed by the UE based on the SPS resource.

Referring back to FIGS. 3 and 4, in one embodiment, the device 300 includes a program code 312 stored in memory 310. The CPU 308 could execute program code 312 (i) to configure a UE with a first SCell; (ii) to configure the UE to use a first SCell deactivation timer for the first SCell; (iii) to configure the UE with a SPS resource on the first SCell; and (iv) to configure the UE not to use the first SCell deactivation timer if a length of the first SCell deactivation timer is shorter than a SPS interval of the SPS resource.

In another aspect, the CPU 308 could execute program code 312 to (i) to configure a UE with a first SCell; (ii) to configure the UE to set and/or use a first SCell deactivation timer with a first value for the first SCell; (iii) to configure the UE with a SPS resource on the first SCell; and (iv) to configure the UE to set and/or use the first SCell deactivation timer with a second value if the first value is shorter than a SPS interval of the SPS resource, wherein the second value is larger than or equal to the SPS interval of the SPS resource.

Furthermore, the CPU 308 can execute the program code 312 to perform all of the above-described actions and steps or others methods described herein.

The above-disclosed methods could reduce signaling overhead for activating or reactivating a SCell and for initiating or reinitiating a SPS resource on the SCell.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of a network node, the method comprising:
configuring a User Equipment (UE) with a first Secondary Cell (SCell);
configuring the UE to use a first SCell deactivation timer for the first SCell;
configuring the UE with a Semi-Persistent Scheduling (SPS) resource on the first SCell;
configuring the UE not to use the first SCell deactivation timer if a length of the first SCell deactivation timer is shorter than a SPS interval of the SPS resource; and
not configuring the UE not to use the first SCell deactivation timer if the length of the first SCell deactivation timer is longer than or equal to the SPS interval of the SPS resource.

2. The method of claim 1, wherein the network node configures the SPS interval and configures the UE not to use the first SCell deactivation timer via different dedicated signalling or the same dedicated signalling.

3. The method of claim 2, wherein the dedicated signalling is a Radio Resource Control (RRC) signalling.

4. The method of claim 1, wherein the first SCell deactivation timer is started or restarted if a downlink control information for the first SCell is transmitted to the UE, a packet is transmitted on the first SCell to the UE, and/or a packet is received on the first SCell from the UE.

5. The method of claim 1, wherein the first SCell is deactivated when the first SCell deactivation timer expires.

6. The method of claim 1, wherein the UE is using the first SCell deactivation timer when receiving a dedicated signalling for configuring the UE with the SPS resource.

7. The method of claim 1, wherein the SPS resource is a resource on which the UE periodically performs an uplink transmission or a downlink reception.

8. The method of claim 1, wherein the SPS interval is an interval between two uplink transmissions or two downlink receptions performed by the UE based on the SPS resource.

9. A method of a network node, the method comprising:
configuring a User Equipment (UE) with a first Secondary Cell (SCell);
configuring the UE to set and/or use a first SCell deactivation timer with a first value for the first SCell;
configuring the UE with a Semi-Persistent Scheduling (SPS) resource on the first SCell;
configuring the UE to set and/or use the first SCell deactivation timer with a second value if the first value is shorter than a SPS interval of the SPS resource, wherein the second value is larger than or equal to the SPS interval of the SPS resource; and
not configuring the UE to set and/or use the first SCell deactivation timer with the second value if the first value is longer than or equal to the SPS interval of the SPS resource.

10. The method of claim 9, wherein the network node configures the SPS interval and configures the UE to set and/or use the first SCell deactivation timer with the second value via different dedicated signalling or the same dedicated signalling.

11. The method of claim 10, wherein the dedicated signalling is Radio Resource Control (RRC) signalling.

12. The method of claim 9, wherein the first SCell deactivation timer is started or restarted if a downlink control information for the first SCell is transmitted to the UE, a packet is transmitted on the first SCell to the UE, and/or a packet is received on the SCell from the UE.

13. The method of claim 9, wherein the first SCell is deactivated when the first S Cell deactivation timer expires.

14. The method of claim 9, wherein the UE is using the first SCell deactivation timer when receiving a dedicated signalling for configuring the UE with the SPS resource.

15. The method of claim 9, wherein the SPS resource is a resource on which the UE periodically performs uplink transmission or downlink reception.

16. The method of claim 9, wherein the SPS interval is an interval between two uplink transmissions or two downlink receptions performed by the UE based on the SPS resource.

17. A network node, comprising:
a control circuit;
a processor installed in the control circuit; and
a memory installed in the control circuit and coupled to the processor;
wherein the processor is configured to execute a program code stored in the memory to:
configure a User Equipment (UE) with a first Secondary Cell (SCell);
configure the UE to use a first SCell deactivation timer for the first SCell;
configure the UE with a Semi-Persistent Scheduling (SPS) resource on the first SCell;
configure the UE not to use the first SCell deactivation timer if a length of the first SCell deactivation timer is shorter than a SPS interval of the SPS resource; and
not configure the UE not to use the first SCell deactivation timer if the length of the first SCell deactivation timer is longer than or equal to the SPS interval of the SPS resource.

* * * * *